United States Patent
Lee et al.

(10) Patent No.: US 10,248,222 B2
(45) Date of Patent: Apr. 2, 2019

(54) METHOD FOR PROCESSING EVENT SIGNAL AND EVENT-BASED SENSOR PERFORMING THE SAME

(71) Applicant: SAMSUNG ELECTRONICS CO., LTD., Suwon-si (KR)

(72) Inventors: Hyunku Lee, Suwon-si (KR); Hyunsurk Ryu, Hwaseong-si (KR); Keun Joo Park, Seoul (KR); Jin-Man Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/665,914

(22) Filed: Aug. 1, 2017

(65) Prior Publication Data

US 2018/0032150 A1 Feb. 1, 2018

(30) Foreign Application Priority Data

Aug. 1, 2016 (KR) .................. 10-2016-0098087

(51) Int. Cl.
| | |
|---|---|
| *G06F 3/03* | (2006.01) |
| *G06F 3/0488* | (2013.01) |
| *H04N 5/235* | (2006.01) |
| *G06F 1/3234* | (2019.01) |

(Continued)

(52) U.S. Cl.
CPC .......... *G06F 3/0304* (2013.01); *G06F 1/3262* (2013.01); *G06F 3/0488* (2013.01); *H04N 5/2357* (2013.01); *G06F 3/017* (2013.01); *G06T 2207/20182* (2013.01); *H04N 5/357* (2013.01)

(58) Field of Classification Search
None
See application file for complete search history.

(56) References Cited

U.S. PATENT DOCUMENTS

| | | |
|---|---|---|
| 5,204,741 A | 4/1993 | Sakaguchi |
| 8,432,460 B2 | 4/2013 | Nakasuji et al. |
| 8,543,241 B2 | 9/2013 | Hong et al. |

(Continued)

FOREIGN PATENT DOCUMENTS

| | | |
|---|---|---|
| JP | 2687670 B2 | 12/1997 |
| JP | 3200950 B2 | 8/2001 |

(Continued)

OTHER PUBLICATIONS

Communication dated Jan. 8, 2018 by the European Patent Office in counterpart European Patent Application No. 17179009.0.

(Continued)

*Primary Examiner* — Duane N Taylor, Jr.
(74) *Attorney, Agent, or Firm* — Sughrue Mion, PLLC (57) ABSTRACT

An event signal processing method and an event-based sensor performing the event signal processing method are provided. The event signal processing method includes receiving an activation signal to indicate sensing of an event from a sensor array, increasing the cumulative event number of a sensing area corresponding to the activation signal among sensing areas of the sensor array, reducing the cumulative event number of each of the sensing areas based on a parameter; and determining, as a flickering area, a sensing area among the sensing areas, of which the cumulative event number exceeds a threshold.

19 Claims, 10 Drawing Sheets

(51) Int. Cl.
*G06F 3/01* (2006.01)
*H04N 5/357* (2011.01)

(56) References Cited

U.S. PATENT DOCUMENTS

| | | | |
|---|---|---|---|
| 8,570,378 | B2 | 10/2013 | Zalewski et al. |
| 8,988,551 | B2 | 3/2015 | Moon et al. |
| 9,176,608 | B1 | 11/2015 | Baldwin et al. |
| 2007/0046790 | A1 | 3/2007 | Nakasuji et al. |
| 2008/0065267 | A1 | 3/2008 | Hong et al. |
| 2009/0122146 | A1 | 5/2009 | Zalewski et al. |
| 2011/0050618 | A1 | 3/2011 | Murphy et al. |
| 2013/0293742 | A1 | 11/2013 | Moon et al. |
| 2014/0104225 | A1* | 4/2014 | Davidson ............... G06F 3/044 345/174 |
| 2014/0118257 | A1* | 5/2014 | Baldwin ............... G06F 3/017 345/158 |
| 2015/0163392 | A1 | 6/2015 | Malone et al. |
| 2015/0234472 | A1 | 8/2015 | Park et al. |
| 2017/0075426 | A1* | 3/2017 | Camacho Perez ...... G06F 3/017 |

FOREIGN PATENT DOCUMENTS

| | | |
|---|---|---|
| JP | 3776094 B2 | 5/2006 |
| JP | 4631611 B2 | 2/2011 |
| JP | 4992618 B2 | 8/2012 |
| JP | 5311922 B2 | 10/2013 |
| KR | 10-0855469 B1 | 9/2008 |
| KR | 10-1071352 B1 | 10/2011 |
| KR | 10-2013-0123221 A | 11/2013 |
| KR | 10-2015-0097984 A | 8/2015 |

OTHER PUBLICATIONS

Insung, et al., "Flicker Removal in Old Films Using Histogram Matching and Difference Images", 2010, 5 pages total.
Sik, et al., "Development of Lane Detection System Using Vision Sensor", 2008, 3 pages total.
Kim, et al., "Deinterlacing Algorithm Based on Statistical Tests", 2008, Journal of Korean Data & Information Science Society, vol. 19, Issue No. 3, 13 pages total.

\* cited by examiner

METHOD FOR PROCESSING EVENT SIGNAL AND EVENT-BASED SENSOR PERFORMING THE SAME

CROSS-REFERENCE TO RELATED APPLICATION

This application claims priority from Korean Patent Application No. 10-2016-0098087, filed on Aug. 1, 2016, in the Korean Intellectual Property Office, the disclosure of which is incorporated by reference herein in its entirety.

BACKGROUND

1. Field

Methods and apparatuses consistent with exemplary embodiments relate to processing an event signal and an event-based sensor.

2. Description of the Related Art

A human-computer interaction (HCI) is realized and operates in a user interface. Various user interfaces used to recognize user inputs may provide a natural interaction between humans and computers. To recognize a user input, various sensors may be used. To provide a natural interaction, a sensor quickly responding to a user input may be required. Also, various mobile devices may need to perform various smart functions using a user interface with low power. Thus, there is a desire for a sensor that consumes relatively low power, that responds to an input at high speed and that has high reliability corresponding to a sensing goal. Also, there is a desire for a method of processing an unnecessary event among various events sensed by a sensor.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems or disadvantages described above.

According to an aspect of an exemplary embodiment, there is provided an event signal processing method including receiving an activation signal to indicate sensing of an event from a sensor array; increasing the cumulative event number of a sensing area corresponding to the activation signal among a plurality of sensing areas of the sensor array; reducing the cumulative event number of each of the sensing areas based on at least one parameter; and determining, as a flickering area, at least one sensing area among the plurality of sensing areas, of which the cumulative event number exceeds a threshold.

The at least one parameter may comprise a first parameter associated with a period to reduce the cumulative event number; or a second parameter associated with a degree by which the cumulative event number is reduced.

The event signal processing method may further comprise, in response to the sensing area being determined as a flickering area, at least one of discarding the activation signal of the sensing area; or outputting a flag indicating that the sensing area corresponding to the activation signal is a flickering area.

The event signal processing method may further comprise changing a sensing area that has been determined as a flickering area to a normal area in response to the cumulative event number of the sensing area being reduced to less than the threshold.

The event signal processing method may further comprise at least one of additionally reducing the cumulative event number of the changed sensing area; or initializing the cumulative event number of the changed sensing area.

The event signal processing method may further comprise determining whether the cumulative event number of the changed sensing area is to be additionally reduced or initialized, based on whether the changed sensing area is a flickering area or a normal area for a predetermined period of time.

The increasing may comprise increasing the cumulative event number of the sensing area corresponding to the activation signal based on a maximum cumulative threshold.

Each of the plurality of sensing areas may have an individual parameter that is set for the sensing area, and the reducing may comprise reducing the cumulative event number of each of the plurality of sensing areas based the individual parameter set for the sensing area.

The event signal processing method may further comprise setting an individual parameter of at least one sensing area based on user feedback to indicate a flickering object.

The event signal processing method may further comprise setting an individual parameter based on a variation in the cumulative event number of each of the sensing areas during a predetermined period of time.

Each of the sensing areas may correspond to at least one pixel included in the sensor array.

According to another aspect of an exemplary embodiment, there is provided an event signal processing method comprising receiving an activation signal that indicates sensing of an event from a sensor array in a sleep mode; determining whether a sensing area corresponding to the activation signal among a plurality of sensing areas of the sensor array is a flickering area; and switching the sensor array from the sleep mode to an active mode based on a determination that the sensing area corresponding to the activation signal is not a flickering area.

The determining may comprise increasing the cumulative event number of the sensing area corresponding to the activation signal; reducing the cumulative event number of each of the plurality of sensing areas based on at least one parameter; and determining, as a flickering area, at least one sensing area among the plurality of sensing areas of which the cumulative event number exceeds a threshold.

The at least one parameter may be determined based on whether the sensor array operates in the sleep mode or the active mode.

The threshold may be determined based on whether the sensor array operates in the sleep mode or the active mode.

The sensor array may be configured to output an activation signal associated with a portion of pixels included in a sensing area in the sleep mode.

The sensor array may be configured to output an activation signal associated with all pixels included in the sensor array in the active mode.

The sensor array may be configured to output an activation signal associated with all pixels included in the sensor array in the active mode.

According to another aspect of an exemplary embodiment, there is provided an event-based sensor comprising a sensor array configured to output an activation signal to indicate sensing of an event; and a signal processor configured to increase the cumulative event number of a sensing area among a plurality of sensing areas in the sensor array that corresponds to the activation signal, to reduce the cumulative event number of each of the plurality of sensing areas based on at least one parameter, and to determine, as a flickering area, at least one sensing area among the plurality of sensing areas of which the cumulative event number exceeds a threshold.

The at least one parameter may comprise a first parameter associated with a period to reduce the cumulative event number; or a second parameter associated with a degree by which the cumulative event number is reduced.

The signal processor may be further configured to discard the activation signal or to output a flag indicating that the sensing area corresponding to the activation signal is a flickering area.

The signal processor may be further configured to change a sensing area that has been determined as a flickering area to a normal area in response to the cumulative event number of the sensing area being reduced to less than the threshold.

The signal processor may be further configured to additionally reduce or initialize the cumulative event number of the changed sensing area.

The signal processor may be further configured to determine whether the cumulative event number of the changed sensing area is to be additionally reduced or initialized, based on whether the changed sensing area is a flickering area or a normal area for a predetermined period of time.

The signal processor may be further configured to increase the cumulative event number of the sensing area corresponding to the activation signal based on a maximum cumulative threshold.

The signal processor may be further configured to reduce a cumulative event number of each of the plurality of sensing areas based on an individual parameter set for each of the sensing areas.

Each of the plurality of sensing areas may have an individual parameter that is set for the sensing area, and the signal processor may be further configured to set an individual parameter of at least one sensing area based on user feedback indicating a flickering object.

The signal processor may be further configured to set an individual parameter of a sensing area based on a variation in the cumulative event number of each of the sensing areas during a predetermined period of time.

According to another aspect of an exemplary embodiment, there is provided an event-based sensor comprising a sensor array configured to output an activation signal associated with a portion of pixels included in a sensing area in a sleep mode, the sensor array operating in the sleep mode or an active mode; and a signal processor configured to receive an activation signal from the sensor array in the sleep mode, to determine whether a sensing area corresponding to the activation signal among a plurality of sensing areas of the sensor array is a flickering area, and to switch the sensor array from the sleep mode to the active mode based on a determination that the sensing area corresponding to the activation signal is not the flickering area.

The signal processor may be further configured to increase a cumulative event number of the sensing area corresponding to the activation signal, to reduce the cumulative event number of each of the plurality of sensing areas based on at least one parameter, and to determine, as a flickering area, at least one sensing area among the plurality of sensing areas of which the cumulative event number exceeds a threshold.

The at least one parameter may be determined based on whether the sensor array operates in the sleep mode or the active mode.

The threshold may be determined based on whether the sensor array operates in the sleep mode or the active mode.

The sensor array may be further configured to output an activation signal associated with all pixels included in the sensor array in the active mode.

According to another aspect of an exemplary embodiment, there is provided an event signal processing method comprising sensing activation of one or more sensing areas among a plurality of sensing areas of a sensor array; determining whether the activated one or more sensing areas are associated with a meaningful event or a meaningless event; filter out sensing areas determined to be associated with a meaningless event; and outputting an event signal corresponding to sensing areas determined to be associated with a meaningful event.

The filtering may comprise discarding the meaningless event.

The filtering may comprise outputting a flag indicating that the sensing area determined to be associated with a meaningless event is a meaningless event.

The meaningful event may be an event caused by activation of sensing areas by a movement of a hand of a user, and the meaningless event may be an event caused by activation of sensing areas by a flickering object.

Each of the plurality of sensing areas may have a corresponding cumulative event number, and the sensing may comprise adjusting the cumulative event number the sensing areas based on the sensed activation of the one or more sensing area and at least one parameter.

The activated one or more sensing areas may be determined as being associated with a meaningless event when the cumulative event number of the one or more sensing areas is greater than a threshold.

DETAILED DESCRIPTION

Below, exemplary embodiments will be described more fully with reference to accompanying drawings to such an extent that one of an ordinary skill in the art may implement various aspects of the present disclosure.

Figure 1:
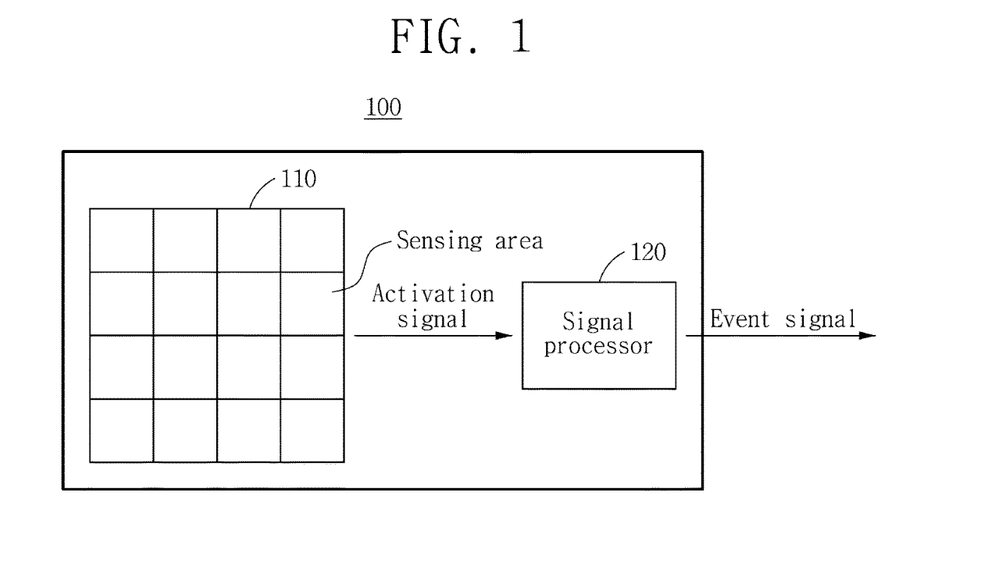
FIG. 1 is a block diagram illustrating an example of an event-based sensor according to an exemplary embodiment.

FIG. 1 is a block diagram illustrating an event-based sensor 100 according to an exemplary embodiment. Referring to FIG. 1, the event-based sensor 100 includes a sensor array 110 and a signal processor 120. The sensor array 110 may sense an event in which an intensity of light incident on a sensing pixel changes, and may output an activation signal to indicate sensing of the event. An event may occur by at least one of a movement of an object, a movement of a camera including the event-based sensor 100 or a change in light. For example, the sensor array 110 may sense an event caused by a hand movement of a user, and may output an activation signal to indicate sensing of the event. In this example, the activation signal may be utilized to recognize a gesture of the user.

Events may be classified into meaningful events and meaningless events. For example, a movement of a flickering object such as a fluorescent light, a display screen, tremulous leaves, snow, rain or the sun, may not include meaningful information. By contrast, a hand movement of a user may include meaningful information. An event caused by the flickering object may be classified as a meaningless event. Since a sensing pixel responds to an event caused by the flickering object, an activation signal associated with a meaningless event caused by the flickering object may be output. To prevent additional consumption of resources due to the meaningless event, the meaningless event may need to be properly processed.

The signal processor 120 may determine whether the activation signal is associated with a meaningful event or a meaningless event and may output an event signal based on a determination result. The signal processor 120 may be implemented as, for example, at least one processor or a circuit including at least one element. The signal processor 120 may increase the cumulative event number of a sensing area corresponding to an activation signal among sensing areas, may reduce the cumulative event number of each of the sensing areas based on at least one parameter, and/or may determine, as a flickering area, at least one sensing area of which the cumulative event number exceeds a threshold among the sensing areas. This operation of the signal processor 120 will be further described below. Hereinafter, the cumulative event number of a sensing area may refer to the number of events accumulated in a sensing area. The signal processor 120 may determine an activation signal corresponding to a flickering area to be associated with a meaningless event, and may discard the activation signal or output a flag to indicate that the activation signal is associated with the meaningless event. The signal processor 120 may determine an activation signal corresponding to a normal area to be associated with a meaningful event, and may transfer an event signal of a corresponding event to an external device.

Figure 2:
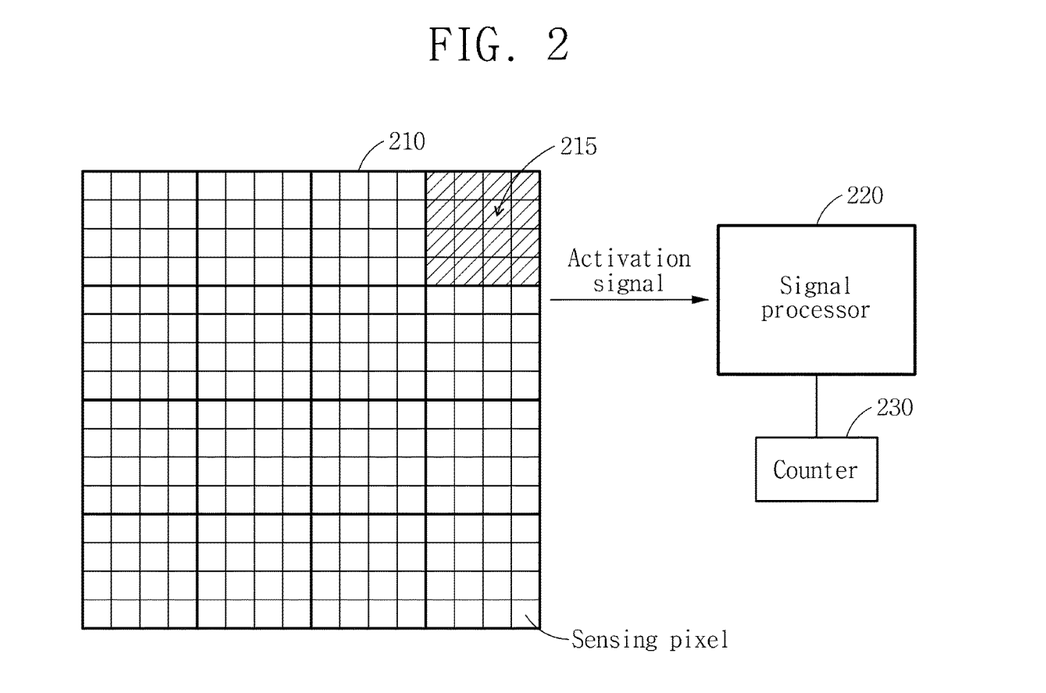
FIG. 2 is a diagram illustrating a sensor array and a signal processor according to an exemplary embodiment.

FIG. 2 is a diagram illustrating a sensor array 210 and a signal processor 220 according to an exemplary embodiment. Referring to FIG. 2, the sensor array 210 includes a plurality of sensing pixels. A sensing pixel that senses an event among the plurality of sensing pixels may be referred to as an "active pixel." The active pixel may generate a response signal in response to sensing of the event. The sensor array 210 may output an activation signal based on the response signal of the active pixel. The activation signal may include an address of the active pixel. The sensor array 210 may be divided into sensing areas. The sensing areas may have various shapes including a rectangular shape as shown in FIG. 2. Each of the sensing areas may include at least one sensing pixel. Numbers of sensing pixels included in each of the sensing areas may be the same or different from each other. For example, in FIG. 2, an individual sensing pixel pointed to by "Sensing pixel" in FIG. 2 may be a sensing area. Alternatively, a dark-shaded box in FIG. 2 of 4×4 pixels pointed to by reference designator 215 may be a sensing area. However, these are only examples and the number of pixels included in a sensing area is not limited.

The signal processor 220 may receive an activation signal from the sensor array 210. The signal processor 220 may increase the number of events sensed in each of the sensing areas based on the activation signal. For example, when an activation signal corresponding to active pixels included in a sensing area 215 is received, the signal processor 220 may increase the number of events sensed in the sensing area 215. The signal processor 220 may identify a sensing area corresponding to the activation signal based on an address of an active pixel included in the activation signal and may increase the number of events sensed in the identified sensing area. A maximum cumulative threshold may be set for limiting the cumulative event number. When the cumulative event number is increased to the maximum cumulative threshold, the signal processor 220 may not increase the cumulative event number any more. The sensing area may be continuously recognized as a flickering area because the cumulative event number of the sensing area is too large even though flickering is terminated in the sensing area. Thus, a recognition rate of a flickering area may increase according to the maximum cumulative threshold.

The signal processor 220 may decrease the cumulative event number of each of the sensing areas based on at least one parameter. The at least one parameter may include a first parameter associated with a period to reduce the cumulative event number and a second parameter associated with a degree to reduce the cumulative event number. For example, the signal processor 220 may reduce the cumulative event number of each of the sensing areas at the period based on the first parameter. Alternatively, the signal processor 220 may reduce the cumulative event number at a reduction amount or a reduction rate based on the second parameter. As another example, both parameters may be used, and the signal processor 220 may reduce the cumulative event number of each of the sensing areas at the period based on the first parameter and at a reduction amount or a reduction rate based on the second parameter. The signal processor 220 may apply different reduction amounts or different reduction rates to the sensing areas using individual parameters, which will be further described below. A reduction amount or a reduction rate suitable for a characteristic of a sensed object may be applied to the sensing areas based on individual parameters, and a recognition rate of a flickering area may increase.

The signal processor 220 may determine, as a flickering area, at least one sensing area of which the cumulative event number exceeds a threshold among the sensing areas. In an example, the signal processor 220 may discard an activation signal generated in a flickering area. In another example, the signal processor 220 may output an event signal corresponding to an activation signal generated in a flickering area and may indicate that the event signal is generated by a flickering event. For example, the signal processor 220 may output a flag indicating that the activation signal corresponding to the event signal is sensed in the flickering area, together with the event signal. In another example, the signal processor 220 may display a flag indicating that the activation signal corresponding to the event signal is sensed in the flickering area on the event signal. The threshold may be determined based on feedback of a user or may be experimentally determined in a manufacturing process. Individual parameters may be determined for each of the sensing areas based on feedback of a user, and the threshold may be determined by the individual parameters, which will be further described below.

When the cumulative event number of a sensing area determined as a flickering area is reduced to be less than the threshold, the signal processor 220 may change the flickering area to a normal area. When an activation signal generated in the normal area is received, the signal processor 220 may output an event signal corresponding to the activation signal. The event signal may include an address of an active pixel and a timestamp about a time at which the active pixel senses an event. Also, the event signal may include a flag indicating that the activation signal corresponding to the event signal is sensed in the normal area.

When the sensing area is changed from the flickering area to the normal area, it may be advantageous to sufficiently reduce the cumulative event number of the sensing area, because the sensing area is changed from the flickering area to the normal area in response to a termination of flickering and the cumulative event number of the changed sensing area may exceed the threshold due to a meaningful event. Thus, the signal processor 220 may additionally reduce or initialize the cumulative event number of the changed sensing area.

The signal processor 220 may determine whether the changed sensing area is to be additionally reduced or initialized, based on whether the changed sensing area is the flickering area or the normal area within a predetermined period of time. For example, when the changed sensing area is a flickering area for a period of time longer than a predetermined period of time, the signal processor 220 may additionally reduce or may initialize the cumulative event number of the changed sensing area. However, when the cumulative event number of the changed sensing area is additionally reduced or initialized in response to the cumulative event number exceeding the threshold and then decreased to be less than the threshold for a relatively short period of time (for example, a single interval), an accuracy to identify a flickering area may be reduced.

The signal processor 220 may increase or decrease the cumulative event number using a counter 230. Also, the signal processor 220 may determine a flickering area by referring to the cumulative event number of each sensing area stored in the counter 230. The counter 230 may be implemented as, for example, a memory or a circuit including at least one element.

Figure 3:
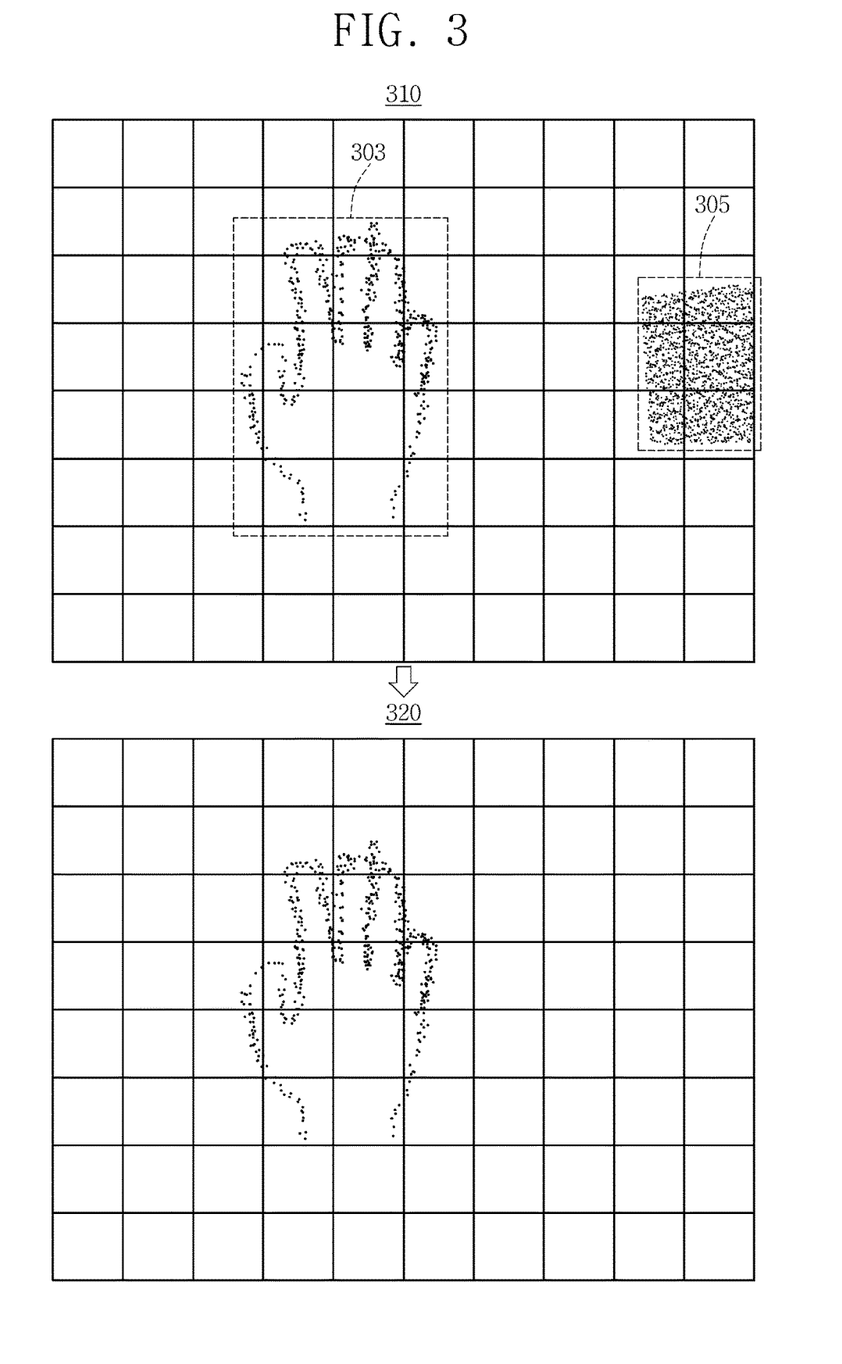
FIG. 3 is a diagram illustrating an image by an activation signal and an image by an event signal according to an exemplary embodiment.

FIG. 3 is a diagram illustrating an image by an activation signal and an image by an event signal according to an exemplary embodiment. FIG. 3 illustrates an image 310 by an activation signal and an image 320 by an event signal. That is, image 310 shows an image that is generated by activated sensing pixels, and image 320 shows an image that is determined to be an event. The image 310 includes a hand 303 of a user and a flickering object 305. The hand 303 may enable an occurrence of a meaningful event such as a gesture. However, because the flickering object 305 may meaninglessly consume resources of a memory or a processor, it is advantageous to remove an activation signal corresponding to the flickering object 305. The flickering object 305 may include a fluorescent light, a display screen, tremulous leaves, snow, rain, the sun, etc. An event-based sensor according to an exemplary embodiment may remove the activation signal corresponding to the flickering object 305, and thus the image 320 may be acquired by the event signal.

Figure 4:
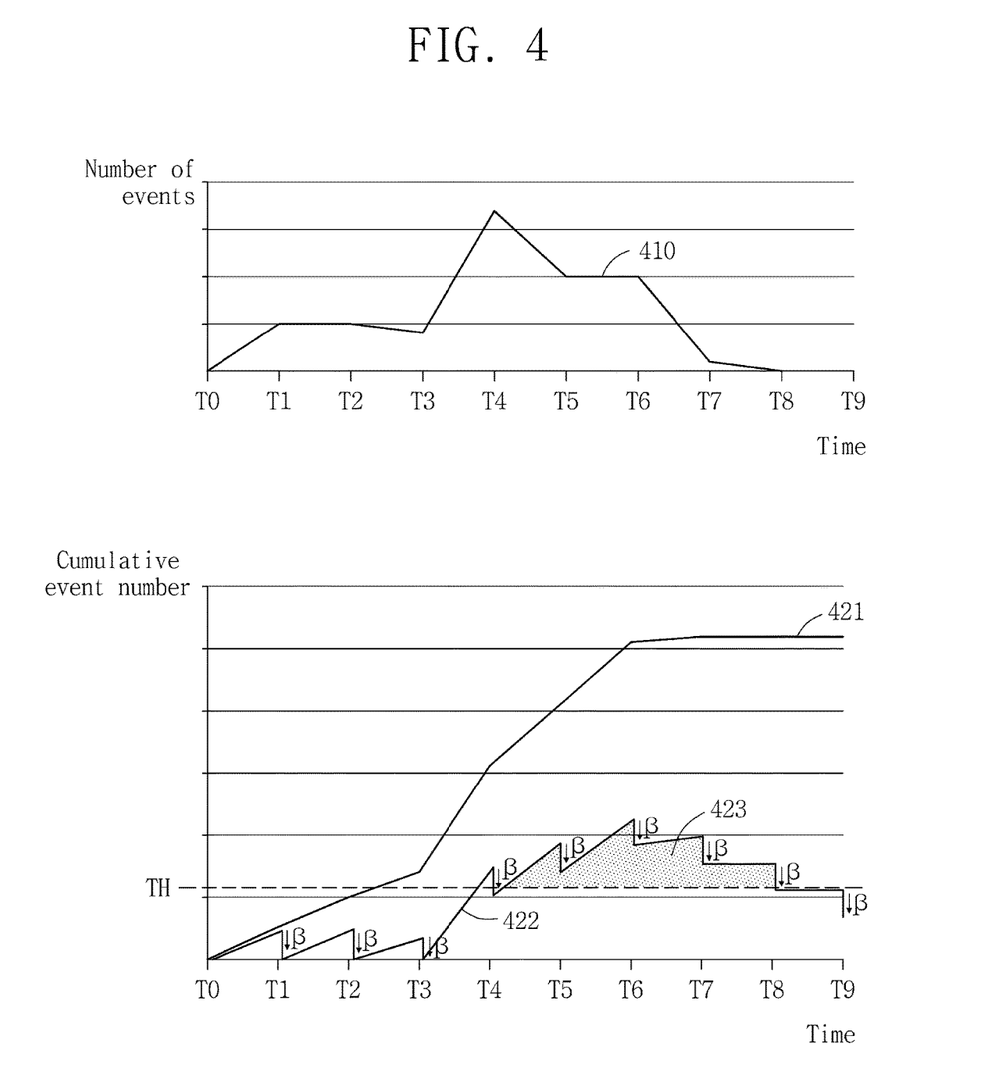
FIG. 4 illustrates the number of events counted and the cumulative event number according to an exemplary embodiment.

FIG. 4 illustrates the number of events counted and the cumulative event number according to an exemplary embodiment. FIG. 4 illustrates the number 410 of events sensed in a sensing area S, the cumulative event number 421 of the sensing area S, and the cumulative event number 422 of the sensing area S that is periodically reduced. As described above, a signal processor may increase the cumulative event number of a sensing area corresponding to an activation signal and may reduce the cumulative event number of each of sensing areas based on at least one parameter. The at least one parameter may include a first parameter associated with a period to reduce the cumulative event number, and/or a second parameter associated with a degree to reduce the cumulative event number. In FIG. 4, an interval between times Ti where i has a value of "0" to "9," represents a period corresponding to the first parameter, and β represents a reduction amount corresponding to the second parameter. The cumulative event number 422 exceeds a threshold TH after a time T4, and is reduced to be less than the threshold TH after a time T8. Also, a portion 423 is associated with a flickering event. The signal processor may determine the sensing area S as a flickering area after the time T4 at which the cumulative event number 422 exceeds the threshold TH, and may determine the sensing area S as a normal area after the time T8 at which the cumulative event number 422 is reduced to be less than the threshold TH.

Figure 5:
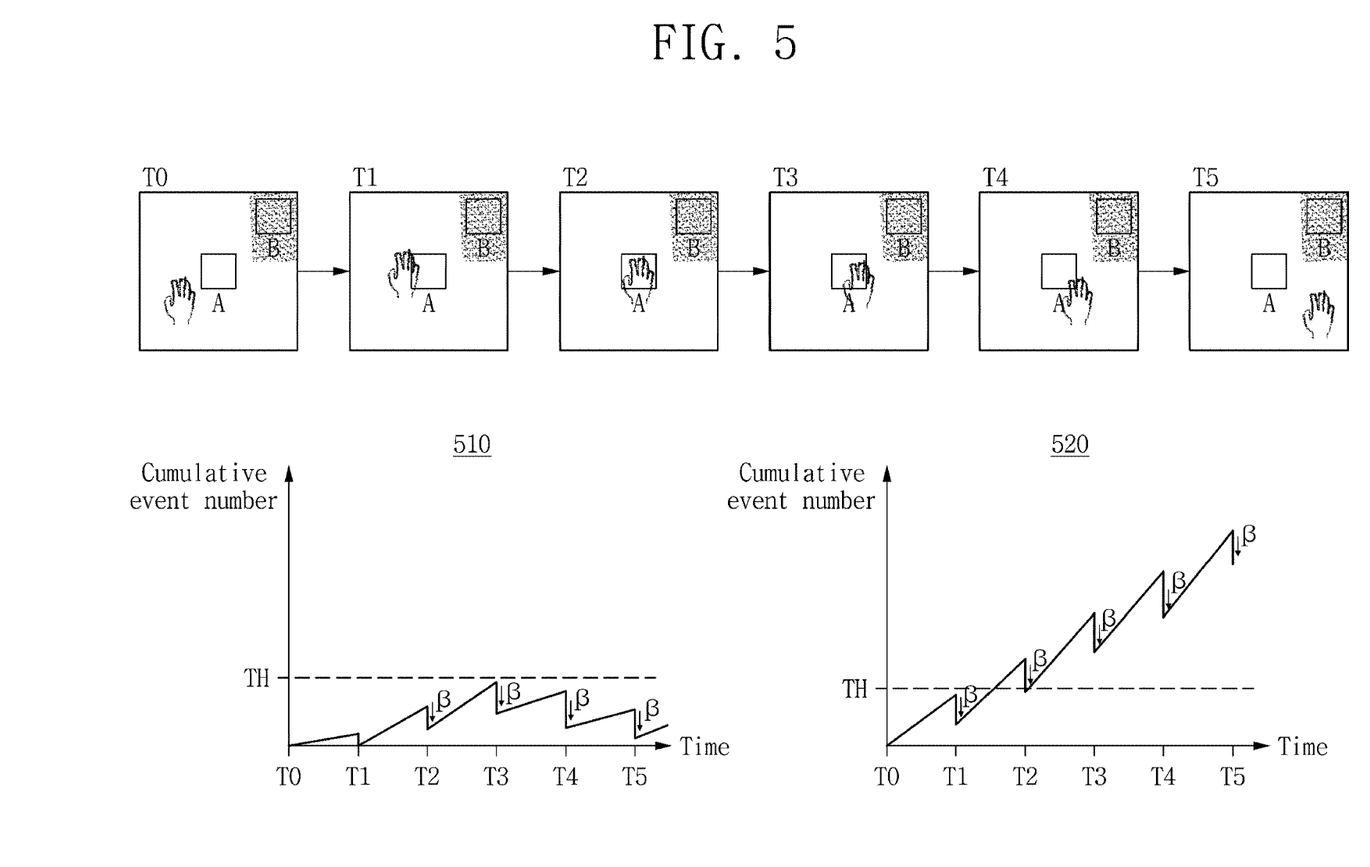
FIG. 5 illustrates the number of events in a flickering area and the number of events in a normal area according to an exemplary embodiment.

FIG. 5 illustrates the number of events in a flickering area and the number of events in a normal area according to an exemplary embodiment. FIG. 5 illustrates the cumulative event number 510 of an area A and the cumulative event number 520 of an area B. The area A senses a hand movement of a user, and the area B senses a flickering object. In FIG. 5, the cumulative event number 510 does not exceed a threshold during all time intervals. Thus, a signal processor may output an event signal based on an activation signal corresponding to the area A. The cumulative event number 520 exceeds the threshold during an interval between times T1 and T2 and continues exceeding the threshold through time T5. The signal processor may recognize the flickering object of the area B in the interval between the times T1 and T2. The signal processor may determine, as a flickering area, at least one sensing area corresponding to the area B in response to the cumulative event number 520 exceeding the threshold. Also, the signal processor may discard an activation signal corresponding to the area B, or may output an event signal based on the activation signal corresponding to the area B and indicate that the event signal is generated by a flickering event.

Figure 6:
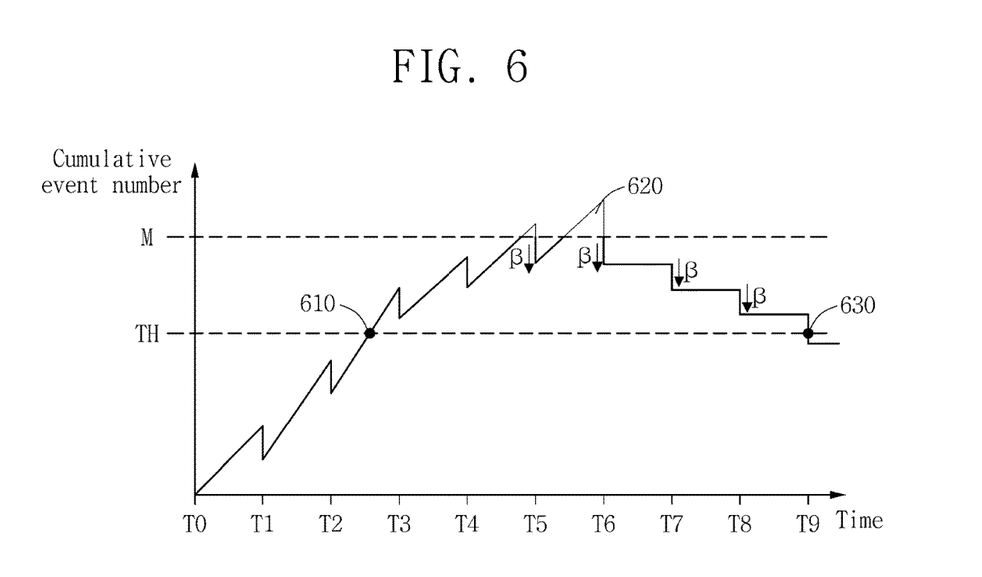
FIG. 6 illustrates the cumulative event number based on a maximum cumulative threshold according to an exemplary embodiment.

FIG. 6 illustrates the cumulative event number based on a maximum cumulative threshold according to an exemplary embodiment. Referring to FIG. 6, the cumulative event number of a sensing area S exceeds a threshold TH at a point 610 and is reduced to be less than the threshold TH at a point 630. Also, the cumulative event number exceeds a maximum cumulative threshold M during a period of time corresponding to an interval 620. As described above, the maximum cumulative threshold M may be set for limiting the cumulative event number. When the cumulative event number increases to the maximum cumulative threshold M, a signal processor may not increase the cumulative event number any more. The sensing area S may be continuously recognized as a flickering area because the cumulative event number of is too large even though detection of flickering is effectively terminated in the sensing area S. When the maximum cumulative threshold M is not set, the cumulative event number may be reduced to be less than the threshold TH after a time corresponding to the point 630 similar to the situation shown in FIG. 4. For example, even when a meaningful event occurs immediately after a time T9, the meaningful event may be recognized as a flickering event. Thus, the signal processor may set the maximum cumulative threshold M, to prevent a meaningful event from being omitted.

Figure 7:
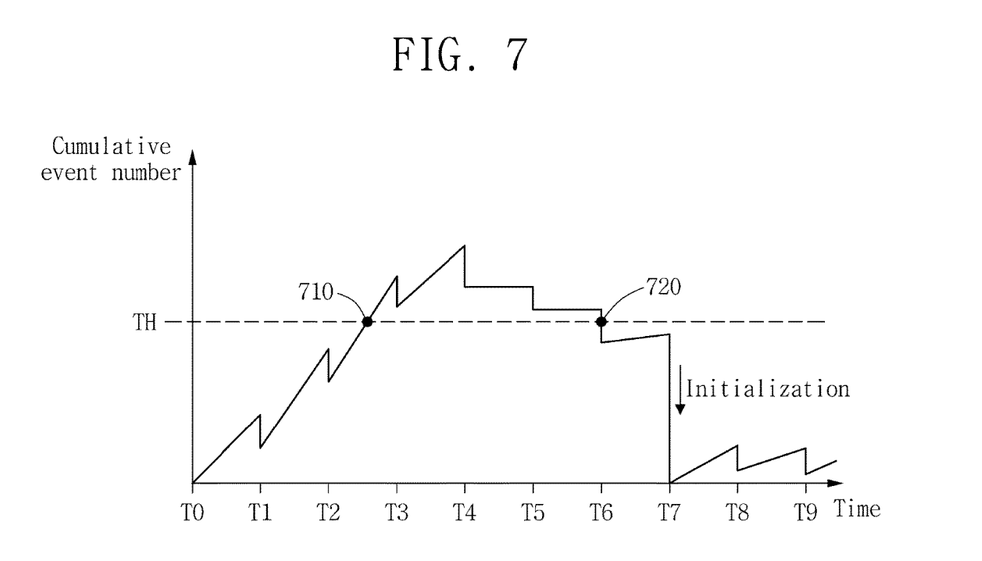
FIG. 7 illustrates initialization of the cumulative event number according to an exemplary embodiment.

FIG. 7 illustrates initialization of the cumulative event number according to an exemplary embodiment. Referring to FIG. 7, the cumulative event number of a sensing area S exceeds a threshold TH at a point 710 and is reduced to be less than the threshold TH at a point 720. A signal processor may determine the sensing area S as a flickering area at the point 710, and may change the sensing area S determined as the flickering area to a normal area at the point 720. When the sensing area S is changed to the normal area, the signal processor may initialize the cumulative event number, because the cumulative event number may exceed the threshold TH again immediately after a time corresponding to the point 720 due to a meaningful event even though the sensing area S is set as the normal area at the point 720 in response to termination of flickering. For example, a meaningful event may occur in an interval between times T6 to T8. In this example, if the cumulative event number is not initialized at the time T6, the cumulative event number may exceed the threshold TH due to the meaningful event.

The initialization of the cumulative event number is merely an example, and the signal processor may additionally reduce the cumulative event number of the changed sensing area S to a reduced level. The reduced level may be a predetermined level. For example, the signal processor may reduce the cumulative event number of the changed sensing area S to a value other than zero, or may reduce the cumulative event number by an amount or at a rate. The value may be preset, and the amount and the rate may be predetermined.

As described above, the signal processor may determine whether the cumulative event number of the changed sensing area S is to be additionally reduced or initialized, based on whether the changed sensing area S is a flickering area or a normal area within a predetermined period of time. For example, when the sensing area S is a flickering area during at least two intervals before a point in time at which the sensing area S is changed to the normal area, the signal processor may additionally reduce or initialize the cumulative event number of the changed sensing area S. In this example, the sensing area S may be the flickering area during three intervals, for example, an interval between times T3 and T4, an interval between times T4 and T5, and an interval between times T5 and T6, and thus the signal processor may additionally reduce or initialize the cumulative event number of the changed sensing area S.

Figure 8:
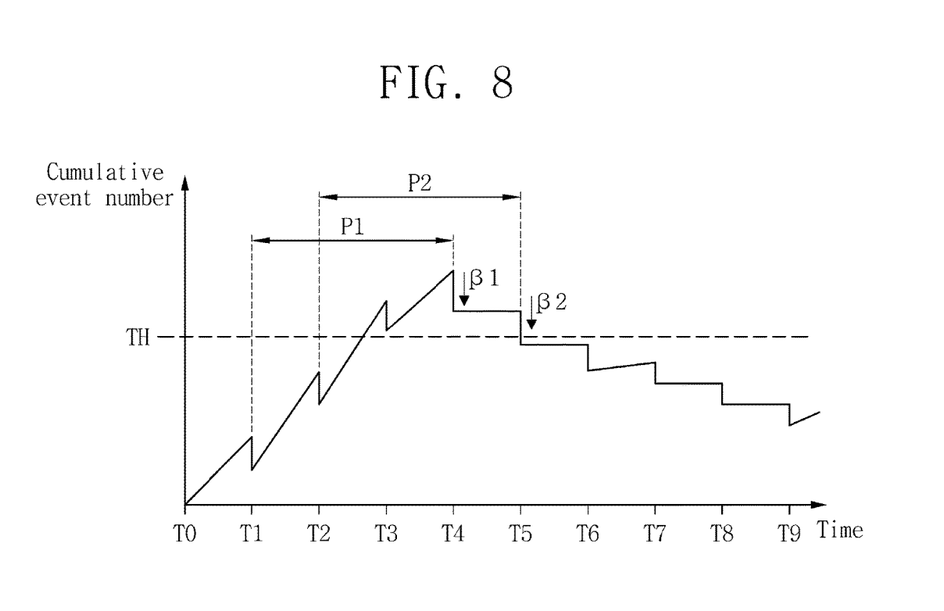
FIG. 8 illustrates reduction of the cumulative event number based on an individual parameter according to an exemplary embodiment.
Figure 9:
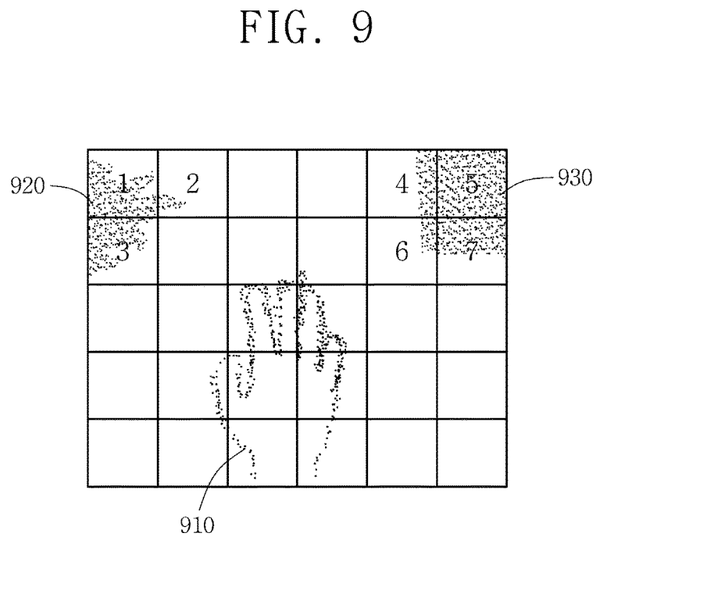
FIG. 9 is a diagram illustrating an output image based on an event signal according to an exemplary embodiment.

FIG. 8 illustrates reduction of the cumulative event number based on an individual parameter according to an exemplary embodiment. Referring to FIG. 8, the cumulative event number of a sensing area S may be reduced at different reduction amounts and/or different reduction rates. A reduction amount or a reduction rate may be determined based on a variation in the cumulative event number of the sensing area S during a predetermined period of time. For example, the reduction amount or the reduction rate may be determined as an average of an increasing amount of the cumulative event number during a predetermined period of time. Also, the reduction amount or the reduction rate may be determined by a statistical scheme other than the average. For example, in FIG. 8, the cumulative event number is reduced by $\beta 1$ at a time T4 and is reduced by $\beta 2$ at a time T5. $\beta 1$ may be an average of the cumulative event number of the sensing area S during a predetermined period of time P1, and $\beta 2$ may be an average of the cumulative event number of the sensing area S during a predetermined period of time P2. A variation in the cumulative event number of the sensing areas during a predetermined period of time may be different, and thus an individual parameter of each of the sensing areas may be different. That is, in FIG. 8, $\beta 1$ may be the same as, or different than $\beta 2$, A signal processor may apply different reduction amounts or different reduction rates to the sensing areas based on individual parameters. The signal processor may set at least one parameter and a threshold based on whether the sensor array operates in the sleep mode or the active mode FIG. 9 illustrates an output image according to an event signal according to an exemplary embodiment. Referring to FIG. 9, the output image includes objects 910, 920 and 930 according to an event signal. The objects 920 and 930 are flickering objects and the object 901 is a meaningful object. An electronic device may acquire an event signal from an event-based sensor and may display an output image based on the acquired event signal. A user may view the output image and input feedback to indicate a flickering object to the electronic device. The electronic device may transfer a feedback signal corresponding to the feedback to a signal processor. The feedback signal may include position information about a position at which the feedback is input. The signal processor may set an individual parameter of at least one sensing area based on the feedback. For example, the signal processor may identify at least one sensing area including a flickering object based on the position information included in the feedback signal and may set an individual parameter of the at least one identified sensing area.

In FIG. 9, a user may verify that the objects 920 and 930 are flickering objects based on the output image, and may input feedback to at least one of sensing areas 1 to 7. For example, the user may input feedback to the sensing area 1. In this example, the signal processor may identify a sensing area S (for example, including sensing areas 1-3) corresponding to the sensing area 1 based on a feedback signal and may set an individual parameter of the sensing area S based on the cumulative event number of the sensing area S. For example, the signal processor may set a threshold to be less than the cumulative event number of the sensing area S. Also, the signal processor may determine a reduction amount or a reduction rate of the sensing area S based on a variation in the cumulative event number of the sensing area S during a predetermined period of time. The signal processor may set an individual parameter of at least one sensing area corresponding to the areas 2 to 7 based on user feedback associated with the areas 2 to 7, similarly to the sensing area S.

Figure 10:
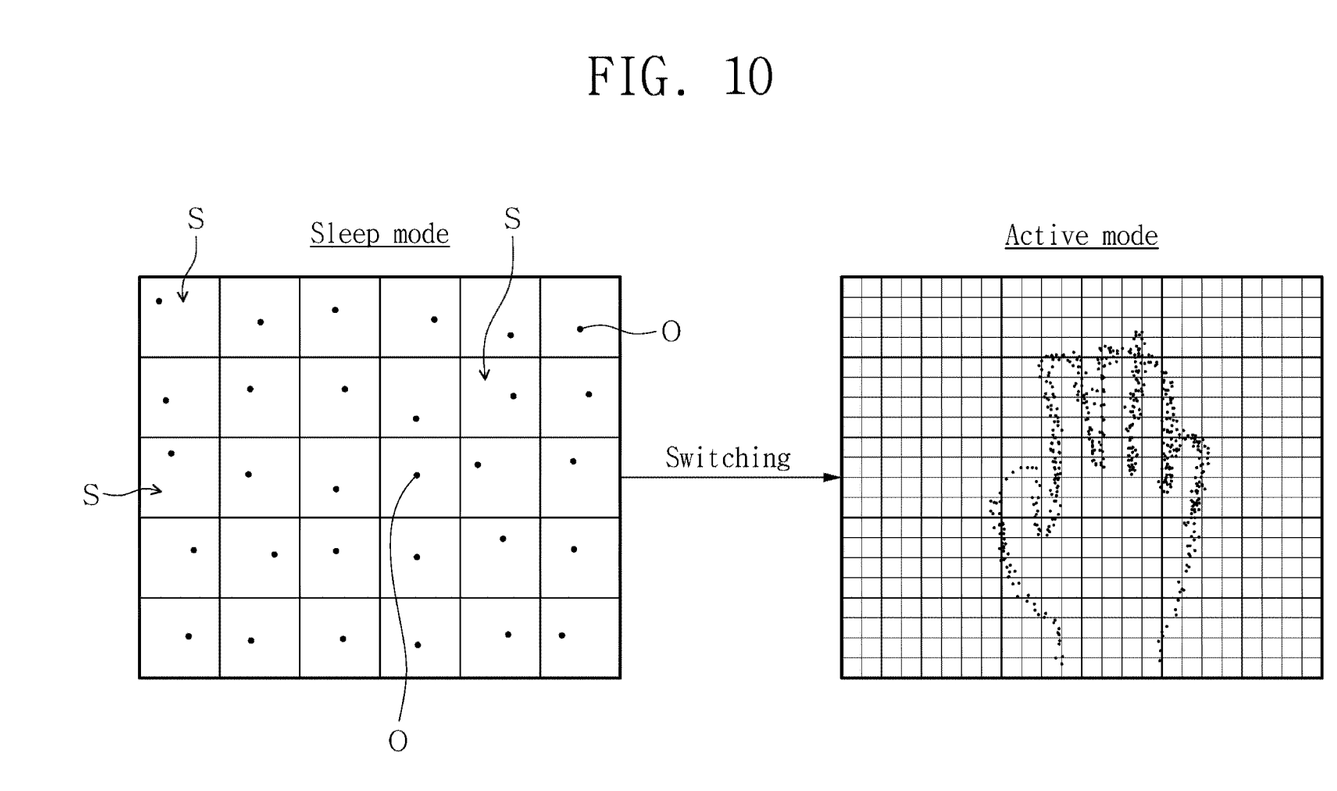
FIG. 10 is a diagram illustrating a sleep mode and an active mode according to an exemplary embodiment.

FIG. 10 is a diagram illustrating a sleep mode and an active mode according to an exemplary embodiment. FIG. 10 illustrates a sensor array that operates in the sleep mode and a sensor array that operates in the active mode. The sensor array may operate at a relatively low resolution in the sleep mode in comparison to the active mode. For example, the sensor array in the sleep mode may output an activation signal associated with a portion of sensing pixels included in a sensing area in the sleep mode. Referring to FIG. 10, points included in sensing areas S of the sensor array operating in the sleep mode represent pixels that output an activation signal. For example, each sensing area S may actually include a plurality of sensing pixels. However, only one pixel of the plurality in each sensing area S will be activated in order to conserve power.

For example, a pixel O that outputs an activation signal may be arbitrarily selected from a sensing area S. A sensor array may determine whether the sensing area S is a flickering area based on the activation signal output from the pixel O. Determining of whether a sensing area is a flickering area has been described above, and accordingly further description thereof is not repeated here. For example, when an activation signal is received from the sensing area S, a signal processor may increase the cumulative event number of the sensing area S, may reduce the cumulative event number based on at least one parameter, and may determine, as a flickering area, the sensing area S in response to the cumulative event number exceeding a threshold.

Based on a determination that the sensing area S is not the flickering area, an operating mode of the sensor array may be switched from the sleep mode to the active mode. A sensor array may be switched from a sleep mode to an active mode based on a control signal for mode switching. The sensor array may output an activation signal associated with all sensing pixels included in the sensor array in the active mode. Thus, the sensor array may output an activation signal associated with an object based on a meaningful event, for example, a hand of a user shown in FIG. 10, in the active mode.

Figure 11:
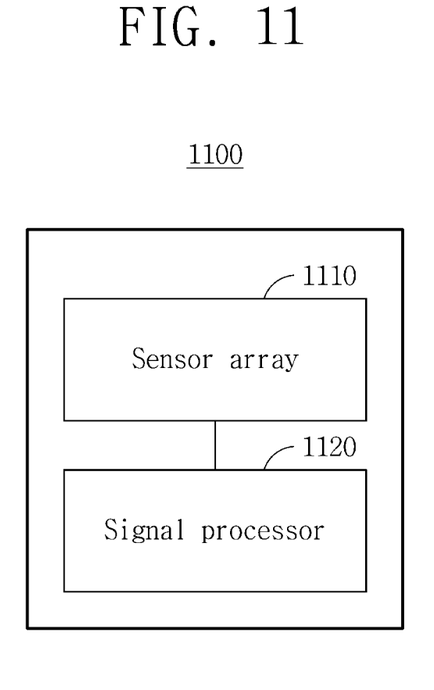
FIG. 11 is a block diagram illustrating another example of an event-based sensor according to an exemplary embodiment.

FIG. 11 is a block diagram illustrating an event-based sensor 1100 according to an exemplary embodiment. Referring to FIG. 11, the event-based sensor 1100 includes a sensor array 1110 and a signal processor 1120. The signal processor 1120 may be implemented as, for example, at least one processor or a circuit including at least one element. The at least one processor may be a central processing unit (CPU) or a microprocessor or the like and may operate in conjunction with one or more memories. The sensor array 1110 may operate in a sleep mode or an active mode. In the sleep mode, the sensor array 1110 may output an activation signal associated with a portion of sensing pixels included in a sensing area. The signal processor 1120 may receive the activation signal from the sensor array 1110 and may determine whether a sensing area corresponding to the activation signal among sensing areas of the sensor array 1110 is a flickering area. The signal processor 1120 may switch the sensor array 1110 from the sleep mode to the active mode based on a determination that the sensing area corresponding to the activation signal is not a flickering area. The above-described operations may be applicable to the event-based sensor 1100, and thus further description of the event-based sensor 1100 is not repeated here.

Figure 12:
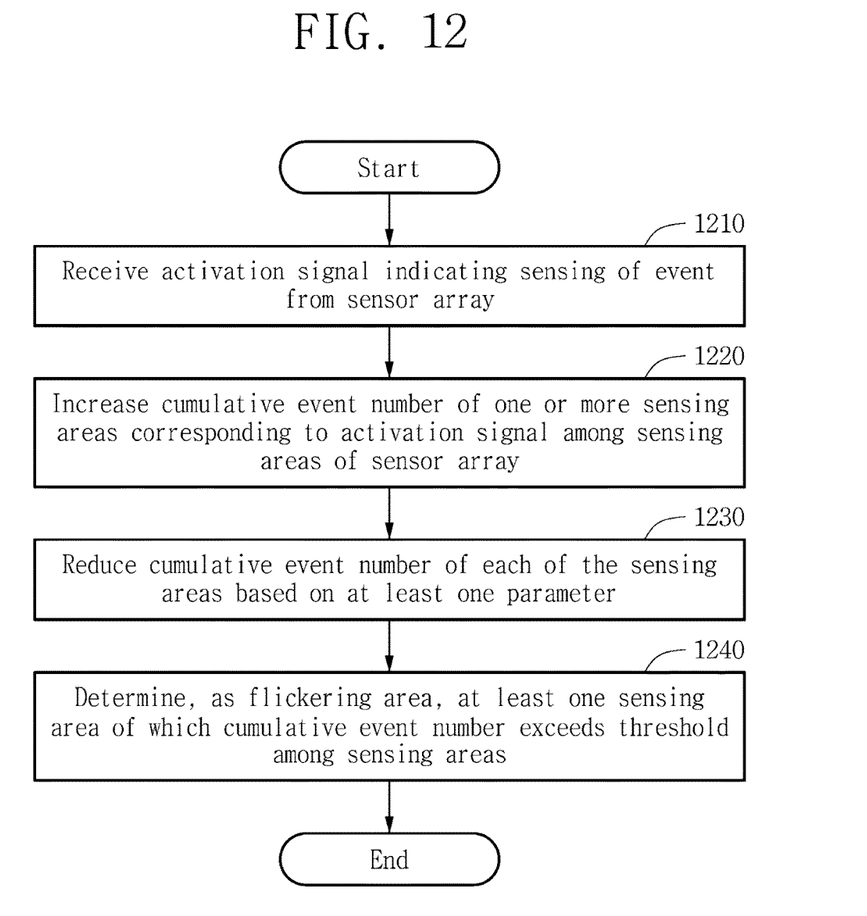
FIG. 12 is a flowchart illustrating an example of an event signal processing method according to an exemplary embodiment.

FIG. 12 is a flowchart illustrating an example of an event signal processing method according to an exemplary embodiment. Referring to FIG. 12, in operation 1210, a signal processor may receive an activation signal indicating sensing of an event from a sensor array. In operation 1220, the signal processor may increase the cumulative event number of one or more sensing areas corresponding to the activation signal among sensing areas of the sensor array. In operation 1230, the signal processor may reduce the cumulative event number of each of the sensing areas based on at least one parameter. In operation 1240, the signal processor may determine, as a flickering area, at least one sensing area of which the cumulative event number exceeds a threshold among the sensing areas. The above-described operations may be applicable to the event signal processing method, and thus further description of the event signal processing method is not repeated here.

Figure 13:
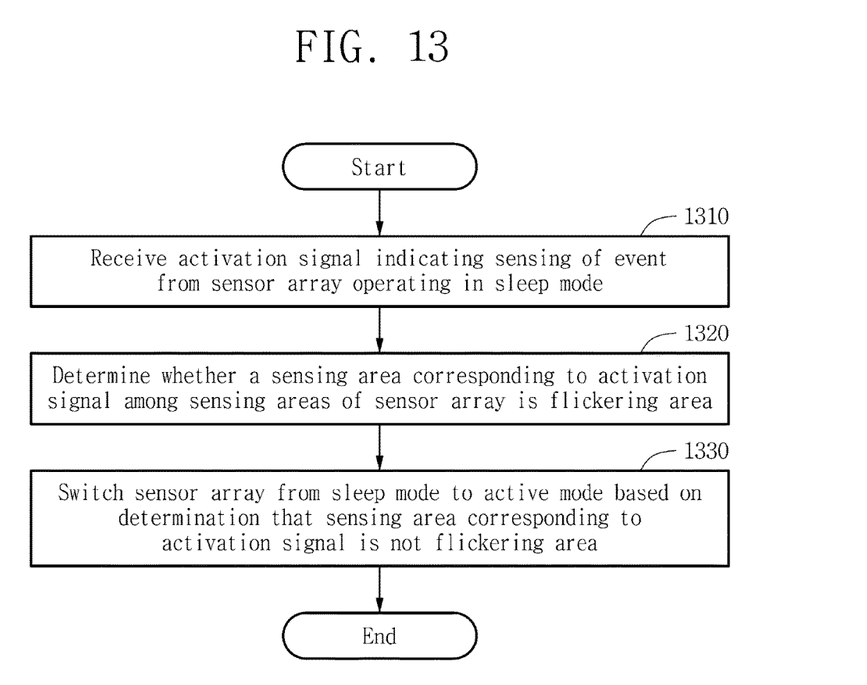
FIG. 13 is a flowchart illustrating another example of an event signal processing method according to an exemplary embodiment.

FIG. 13 is a flowchart illustrating another example of an event signal processing method according to an exemplary embodiment. Referring to FIG. 13, in operation 1310, a signal processor may receive an activation signal indicating sensing of an event from a sensor array that operates in a sleep mode. In operation 1320, the signal processor may determine whether a sensing area corresponding to the activation signal among sensing areas of the sensor array is a flickering area. In operation 1330, the signal processor may switch the sensor array from the sleep mode to an active mode based on a determination that the sensing area corresponding to the activation signal is not a flickering area. The above-described operations may be applicable to the event signal processing method, and thus further description of the event signal processing method is not repeated here.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

While the present disclosure has been described with reference to exemplary embodiments, it will be apparent to those skilled in the art that various changes and modifications may be made without departing from the spirit and scope of the present disclosure. Therefore, it should be understood that the above embodiments are not limiting, but illustrative.

What is claimed is:

1. An event signal processing method comprising:
receiving an activation signal that indicates sensing of an event from a sensor array in a sleep mode;
determining whether a sensing area corresponding to the activation signal among a plurality of sensing areas of the sensor array is a flickering area; and
switching the sensor array from the sleep mode to an active mode based on a determination that the sensing area corresponding to the activation signal is not the flickering area.

2. The event signal processing method of claim 1, wherein the determining comprises:
increasing a cumulative event number of the sensing area corresponding to the activation signal;
reducing a cumulative event number of each of the plurality of sensing areas based on at least one parameter; and
determining, as the flickering area, at least one sensing area among the plurality of sensing areas of which the cumulative event number exceeds a threshold.

3. The event signal processing method of claim 2, wherein the at least one parameter is determined based on whether the sensor array operates in the sleep mode or the active mode.

4. The event signal processing method of claim 2, wherein the threshold is determined based on whether the sensor array operates in the sleep mode or the active mode.

5. The event signal processing method of claim 3, wherein the sensor array is configured to output an activation signal associated with a portion of pixels included in a sensing area in the sleep mode.

6. The event signal processing method of claim 3, wherein the sensor array is configured to output an activation signal associated with all pixels included in the sensor array in the active mode.

7. An event-based sensor comprising:
a sensor array configured to output an activation signal to indicate sensing of an event; and
a signal processor configured to increase a cumulative event number of a sensing area among a plurality of sensing areas in the sensor array that corresponds to the activation signal, to reduce the cumulative event number of each of the plurality of sensing areas based on at least one parameter, and to determine, as a flickering area, at least one sensing area among the plurality of sensing areas of which the cumulative event number exceeds a threshold.

8. The event-based sensor of claim 7, wherein the at least one parameter comprises:
a first parameter associated with a period to reduce the cumulative event number; or
a second parameter associated with a degree by which the cumulative event number is reduced.

9. The event-based sensor of claim 7, wherein the signal processor is further configured to discard the activation signal or to output a flag indicating that the sensing area corresponding to the activation signal is the flickering area.

10. The event-based sensor of claim 7, wherein the signal processor is further configured to change the sensing area that has been determined as the flickering area to a normal area in response to the cumulative event number of the sensing area being reduced to less than the threshold.

11. The event-based sensor of claim 10, wherein the signal processor is further configured to additionally reduce or initialize the cumulative event number of the changed sensing area.

12. The event-based sensor of claim 11, wherein the signal processor is further configured to determine whether the cumulative event number of the changed sensing area is to be additionally reduced or initialized, based on whether the changed sensing area is the flickering area or the normal area for a predetermined period of time.

13. The event-based sensor of claim 7, wherein the signal processor is further configured to increase the cumulative event number of the sensing area corresponding to the activation signal based on a maximum cumulative threshold.

14. The event-based sensor of claim 7, wherein each of the plurality of sensing areas has an individual parameter, and the signal processor is further configured to reduce the cumulative event number of each of the plurality of sensing areas based on the individual parameter for each of the plurality of sensing areas.

15. The event-based sensor of claim 14, wherein the signal processor is further configured to set the individual parameter of at least one sensing area based on user feedback indicating a flickering object.

16. The event-based sensor of claim 14, wherein the signal processor is further configured to set the individual parameter of at least one sensing area based on a variation in the cumulative event number of each of the sensing areas during a predetermined period of time.

17. An event signal processing method comprising:
sensing activation of one or more sensing areas among a plurality of sensing areas of a sensor array;

determining whether the activated one or more sensing areas are associated with a meaningful event or a meaningless event;

filtering out sensing areas determined to be associated with the meaningless event; and outputting an event signal corresponding to sensing areas determined to be associated with the meaningful event.

18. The event signal processing method of claim 17, wherein the filtering comprises discarding the meaningless event.

19. The event signal processing method of claim 17, wherein the filtering comprises outputting a flag indicating that the one or more sensing areas determined to be associated with the meaningless event is the meaningless event.

* * * * *